(12) United States Patent
Hotz et al.

(10) Patent No.: US 9,104,684 B2
(45) Date of Patent: Aug. 11, 2015

(54) CACHE HANDLING IN A DATABASE SYSTEM

(71) Applicant: International Business Machines Corporation, Armonk, NY (US)

(72) Inventors: Ingo Hotz, Karlsruhe (DE); Robert Kern, Boeblingen (DE); Martin Oberhofer, Bondorf (DE); Mathias Rueck, Ulm (DE)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 13/849,019

(22) Filed: Mar. 22, 2013

(65) Prior Publication Data

US 2013/0268734 A1    Oct. 10, 2013

(30) Foreign Application Priority Data

Apr. 4, 2012 (EP) .................................... 12163084

(51) Int. Cl.
*G06F 17/30* (2006.01)

(52) U.S. Cl.
CPC ...... *G06F 17/30132* (2013.01); *G06F 17/3048* (2013.01)

(58) Field of Classification Search
CPC ..................... G06F 17/30132; G06F 17/3048
USPC ........................................................ 711/126
See application file for complete search history.

(56) References Cited

U.S. PATENT DOCUMENTS

| 8,001,332 B2 | 8/2011 | Bell |
| 2011/0066808 A1 | 3/2011 | Flynn et al. |
| 2011/0148895 A1 | 6/2011 | Burckart et al. |

*Primary Examiner* — Yong Choe
(74) *Attorney, Agent, or Firm* — Cantor Colburn LLP

(57) ABSTRACT

Embodiments relate to cache handling in a database system. An aspect includes controlling operations of a set of caches in the database system and determining whether a value of a cache quality parameter of a first cache out of the set of caches meets a cache image creation criterion relating to the first cache. Moreover, an aspect includes selecting at least one cache entry from the first cache, if a value of a related cache entry parameter meets a cache entry criterion, and if the value of the cache quality parameter of the first cache exceeds the predefined value of the cache image creation criterion, and creating a cache image based on the selected at least one cache entry and storing the cache image for further use.

19 Claims, 7 Drawing Sheets

CACHE HANDLING IN A DATABASE SYSTEM

PRIORITY

The present application claims priority to EP12163084 filed on Apr. 4, 2012 in the European Patent Office, and all the benefits accruing therefrom under 35 U.S.C. §119, the contents of which in its entirety are herein incorporated by reference.

BACKGROUND

The present invention relates generally to cache handling in a database system, and more particularly, to creating a cache image based on a value of a cache quality parameter of a given cache meeting a cache image creation criterion.

Database systems and, in particular, relational database systems are used in many different application areas. They belong to the backbone of modern information technology infrastructures including cloud computing environments. Caches and/or buffer pools are an important factor in the performance of databases. In most database systems, the buffer pools are lost once the database system is shutdown (e.g., because of maintenance reasons). Accordingly, after a restart of the database, it takes some time until the buffer pools are being filled again according the workloads. During this time frame, the performance of the database may be decreased significantly. This is because the database system has to read the required database pages from the disk in order to process requests.

Apart from a shutdown and restart scenario, the same problem may exist when the database is backed up and restored. This may, for example, be necessary if another node member has to be added for scalability reasons in a distributed environment.

The size of the buffer pool and the pages accessed mainly determine which database pages are being kept in the buffer pools. Accordingly, in some cases, using a snapshot of a buffer pool is not optimal for a creation of an image because it could be based on workloads that may run in special situations. If, for example, a maintenance workload has been executed that differs from the workload other users execute against the database, it may change the state of the buffer pool substantially. Pages could be pruned from the buffer pool and be replaced by pages that are needed by the maintenance workload only. Restoring such a buffer pool image will not result in optimal performance for the target workload.

BRIEF SUMMARY

According to one embodiment, a method for cache handling in a database system may be provided. The method may include controlling operations of a set of caches in the database system and determining whether a value of a cache quality parameter of a first cache out of the set of caches meets a cache image creation criterion relating to the first cache. Furthermore, the method may include selecting at least one cache entry from the first cache, if a value of a related cache entry parameter meets a cache entry criterion, and if the value of the cache quality parameter of the first cache meets the cache image creation criterion, and creating a cache image based on the selected at least one cache entry and storing the cache image for further use.

According to another embodiment, a cache manager for cache handling in a database system may be provided. The cache manager may include, a controller adapted for managing a set of caches in the database system, a determination unit adapted for determining whether a value of a cache quality parameter of a first cache out of the set of caches meets a cache image creation criterion relating to the first cache, a selection unit adapted for selecting at least one cache entry from the first cache, if a value of a related cache entry parameter meets a cache entry criterion, and if the value of the cache quality parameter of the first cache meets the cache image creation criterion, and a creation unit adapted for creating a cache image based on the selected at least one cache entry and storing the cache image for further use.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
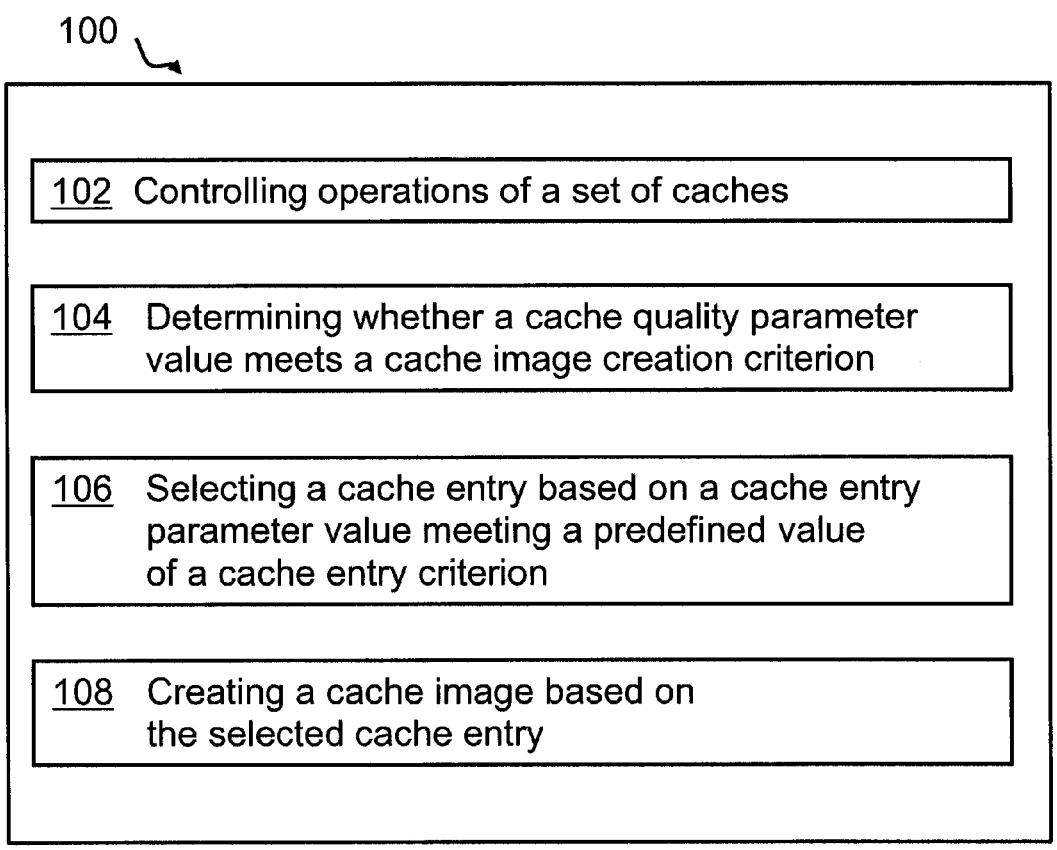
FIG. 1 shows an exemplary block diagram of a process for cache handling in a database system according to an embodiment.

Embodiments disclosed herein are directed to cache handling in a database. An aspect includes controlling operations of a set of caches in the database system and determining whether a value of a cache quality parameter of a first cache out of the set of caches meets a cache image creation criterion relating to the first cache. Moreover, an aspect includes selecting at least one cache entry from the first cache, if a value of a related cache entry parameter meets a cache entry criterion, and if the value of the cache quality parameter of the first cache exceeds the predefined value of the cache image creation criterion, and creating a cache image based on the selected at least one cache entry and storing the cache image for further use.

Embodiments disclosed herein overcome limitations of known cache handling processes, and in particular, overcome limitations of linear cache handling mechanisms. Embodiments may apply also to databases being operated in cloud computing environments.

It may be noted that the expression "meets a criterion" may, for example, mean that a predefined value may be exceeded (i.e., being greater or smaller). It may also mean that compared values may be equal in order to trigger the "exceed condition".

It may also be emphasized here that the exemplary method of an embodiment may be based on a two-operation approach. Firstly, the cache as a whole is assessed, and secondly, the entries of the cache are assessed. Combined, it may be decided, whether to generate and store an image of one or more entries as an image of the cache or cache image according to embodiments. This also may imply that, instead of only one cache entry, several entries may be selected and stored as a cache image.

It may be noted that a cache performance metric, which can be used as a cache quality parameter or based on which the value for the cache quality parameter may be determined, may, for example, be a cache hit rate or ratio. The mentioned cache attribute may, for example, be a size of the cache, and the entry attribute may, for example, be a data type related to that entry (i.e., the type of data stored). That may be "text", "number", "date", etc.

In the context of this application, the following conventions may be followed:

Cache—The term cache may denote a component that may transparently store data so that future requests for that data may be served faster. The data that is stored within a cache may be entries that have been accessed earlier—and thus, duplicates of original entries—which are stored (e.g., in a database on a hard disk). A cache may also be named buffer pool. It may be used for data or applications. A first cache, as mentioned above, may be a predefined first cache or a given first buffer pool. A set of caches may denote a plurality of caches or buffer pools. A cache may include a plurality of different entries (e.g., record sets or index sets of a database table).

Cache quality parameter—The term cache quality parameter may denote a parameter relating to a quality of a cache in terms of a hit rate or ratio of the cache at a given workload characteristic. The cache quality parameter may alternatively refer to a multitude of such parameters. Furthermore, the value for the cache quality parameter may be calculated using a formula or expression that takes as an input one or more values relating to the cache quality. The cache quality parameter may involve or it may be calculated based on cache attribute(s) and/or cache performance metric value(s). The cache quality parameter may thus have a specific value or a tuple of values. The cache quality parameter may be compared with a cache image creation criterion in the sense that a value of the cache quality parameter meets a cache image creation criterion, by exceeding it, for example.

A cache image creation criterion—This term may denote a predefined value or a multitude of values defining a condition—in particular, not the only condition—under which an image of a cache may be generated and stored. Thus, it may relate to a threshold value. The cache image creation criterion may e.g. involve a formula or expression that takes performance metric values and/or cache attributes (as the cache value parameter) as input and gives as output a value that is compared to a threshold or a predefined range.

Cache performance metric value—The term performance metric value may denote one or more dynamic values of performance parameters of a database or a specific cache. The performance metric values may be determined on a regular, continuous basis during an operation of a database.

Cache entry performance metric—The term cache entry performance metric may denote one or more values of performance parameters of a specific entry in a cache. These performance parameters and the related values may have a more dynamic character compared to cache attributes. The cache entry performance metric may be a result of a calculation, for example, a probability and the like.

Cache attribute—The term cache attribute may denote more static values of a cache. They may be simpler, not calculated values if compared to the cache performance metric values. They may be accessed directly without any additional calculations (e.g., last-access-time-stamp, number of times the entry has been accessed in a time interval, data type stored, cache size, etc.)

The terms cache entry performance metric and cache entry attribute may have a comparable relationship as cache performance metric and cache attribute: dynamic vs. static or calculated vs. directly accessible.

Restoration—The term restoration may denote the process of restoring a cache image back from a hard disk into the cache area of a random access memory, sometimes also denoted as main memory. Thus, this expression may denote a recreation of cache entries which originate from an earlier time.

Embodiments for cache handling in a database system may offer a couple of advantages:

One advantage may lie in a calculation of an optimal database cache/buffer pool image based on statistical values collected over time, which may improve the performance of the database, when the image may be applied to the cache, because it then may contain the database pages that match a target workload and thus, access to a hard disk instead of a cache may be avoided. This may especially be useful for comparably large caches or buffer pools that may slowly be filled with needed pages based on workloads. Only if the cache may be filled up right from the beginning with the "right" database pages, database performance may be optimal. This approach overcomes limitation of more simple cache management techniques that may, for example, only be based on a last-in-last-out algorithm.

Besides that, a related algorithm may decide—based on metrics and/or if it is appropriate at all—to backing up a cache. A cache backup or storage may be performed during runtime of the database or a scheduled backup time window. Applying or restoring the cache may also be performed during runtime or a database restoration. Multiple cache images may be managed as part of a database system and may be used to prepare the database system for a workload that can be expected in a certain time frame in the future.

In particular, in cloud environments, embodiments may offer additional quality of service capabilities for quicker database availability with improved performance for dedicated users, or user groups, while at the same time the required amount of total memory may be reduced.

Embodiments may also support partial, tenant-specific cache or buffer pool images if data from different tenants may be stored in the same table space and thus, appear in the same buffer pool or cache.

Additionally, after a restart of the database, the cache or caches may be filled or reloaded or restored with formerly stored images of caches in order to enable good performance of the database and good use of the caches right from the beginning of operation. A swing-in time in order to fill the cache with useful, required database pages and entries may not be required at all.

Embodiments may also help to overcome expensive database separation for different tenants in cloud environments. In order to have a clear data separation between tenants, data of different tenants may also be separated in different databases, which in turn is an expensive method.

A second approach of a shared database but separate database schemas for different tenants in a cloud environment, wherein all tenants have their own tables, is less expensive for the cloud operator. This approach offers a moderate degree of logical data isolation for security-conscious tenants, though not as much as a complete isolated system would, and can support a larger number of users per database. In this scenario, the criteria mentioned above may, for example, be set in such a way that data of different tenants may never appear in the same cache of the database system. So, tenants would never compete for access time to the database and for the cloud operator it may be easier to fulfill service level agreements.

The largest number of tenants can be served in a shared database and shared database schema environment. This is—from a cloud systems operator view—the most inexpensive approach, but it requires a sophisticated database and cache management. Also in this case, embodiments for cache handling in a database system are an instrumental way for supporting effective cache management, isolating workload specific performance requirements to databases, and helping a cloud operator operating a database for multiple tenants to guarantee its service level agreements to the tenants.

According to one embodiment, the value of a cache quality parameter may be based on a combination of a performance metric cache attribute. This may represent a combination of calculated and directly accessed values in order to determine values of the cache quality parameter. The use of performance values that may be available in the database anyway may be reused here, in order to enhance performance characteristics of the database.

In a special case, the value of the cache quality parameter may be a buffer_pool_hit_ratio value, which is calculated by buffer_pool_hit_ratio=(1−(pool_physical_reads)/(pool_logical_reads))*100%, wherein the value of parameter pool_physical_reads is indicative of all pages that were read from disk because they were not already present in the buffer pool, and the value of parameter pool_logical_reads is indicative of the overall number of page accesses for the buffer pool regardless of whether the page had to be read from disk or not.

This formula is valid for all types of logical and physical data accesses. An access may be an access to an index page or a data page.

In another enhanced embodiment, the buffer_pool_hit_ratio BPHR may be calculated as BPHR=(1−(a+b+c+d+e+f)/(g+h+i+j+k+l))*100%, wherein
a=buffer pool data physical reads,
b=buffer pool XDA data physical reads,
c=buffer pool index physical reads,
d=buffer pool temporary data physical reads,
e=buffer pool temporary XDA physical reads,
f=buffer pool temporary index physical reads,
g=buffer pool data logical reads,
h=buffer pool XDA data logical reads,
i=buffer pool index logical reads,
j=buffer pool temporary data logical reads,
k=buffer pool temporary XDA logical reads,
l=buffer pool temporary index logical reads.

This nomenclature may be linked to the database DB2 from IBM, but is not be limited to this database. Comparable variables may be found in other databases as well. Thus, the sum of a, b, c, d, e, f equals to the pool_physical_reads value. The sum of g, h, i, j, k, l equals to the pool_index_reads value.

In case of the database DB2 from IBM, but not limited to that, the following metric parameters may be used: Buffer pool name, Database member, Direct reads from database, Direct read requests, Direct writes to database, Direct write requests, Buffer pool data logical reads, Buffer pool temporary data logical reads, Buffer pool XDA data logical reads, Buffer pool temporary XDA data logical reads, Buffer pool index logical reads, Buffer pool temporary index logical reads, Buffer pool data physical reads, Buffer pool temporary data physical reads, Buffer pool XDA data physical reads, Buffer pool temporary XDA data physical reads, Buffer pool index physical reads, Buffer pool temporary index physical reads, Buffer pool data writes, Buffer pool XDA data writes, Buffer pool index writes, Direct read time, Direct write time, Total buffer pool physical read time, Total buffer pool physical write time, Buffer pool asynchronous data reads, Buffer pool asynchronous read requests, Buffer pool asynchronous data writes, Buffer pool asynchronous index reads, Buffer pool asynchronous index read requests, Buffer pool asynchronous index writes, Buffer pool asynchronous XDA data reads, Buffer pool asynchronous XDA read requests, Buffer pool asynchronous XDA data writes, Buffer pool no victim buffers, Buffer pool log space cleaners triggered, Buffer pool victim page cleaners triggered, Buffer pool threshold cleaners triggered, Total number of pages read by vectored JO, Number of block IO requests, Total number of pages read by block IO, Unread prefetch pages, and Database files closed.

The distinction between a physical and a logical read or write may be in the fact that in one case (physical read) a physical access to data/entries on a hard disk is required, wherein in the other case (logical read) the access to data or database entries may be directed to the cache, such that no physical read from the hard disk is required.

Although the above mentioned metric parameters may be known in the DB2 context, equivalent metrics and attributes may be known from other database systems. In this context, it may also be emphasized that the described method for cache handling may be applicable to any database system. It is not limited to DB2.

According to further embodiments, the cache entry parameter may be based on a combination of a cache entry performance metric and a cache entry attribute. A comparable technique used for the whole cache may be used—so to speak in a second operation—also to individual entries on the cache. With this, a sophisticated technique for determining whether and when an image of a cache and, in particular, with which entries, may be created for storing it. This may save time and effort for system administrators, because this determination may be done automatically without any human intervention for database tuning.

According to further embodiments, restoration of the first cache may be performed during a start-up of the database system. This has the advantage that a cache may not slowly be filled with database pages, thus building up the cache content over time and usage. Instead, the database may have—right from the beginning of a restart—a properly filled cache allowing increasing the database performance.

According to further embodiments, the restoration of the first cache is performed during runtime of the database system. This may be a useful feature because due to changing workloads, different cache entries may be used and accessed regularly if compared to another workload. For example, this may be the case in cloud computing environments when the database workload may switch from one tenant or user to another. Thus, it may become easier for a cloud service provider to guarantee more advanced service level agreements (SLAs) also under more difficult conditions like tenant switches during normal operation.

According to further embodiments, the first cache may relate to a predefined user in a cloud computing environment. Also, this enables better SLAs and thus, a technical and also financial advantage or a cloud service provider. A certain workload of a defined tenant may only run in a certain time window. The cloud provider may then preload—or restore a cache image according to a typical workload of that specific tenant or customer automatically using the above described method. The implication may be that the user may experience high database and thus application performance right from the beginning.

According to embodiments, a content of the first cache, which relates to a first user, may be stored on a long-term storage and a cache content of a second user may be loaded from the long-term storage, such that the content of the first cache is swapped. This scenario may support a usage by different tenants or users in different time windows. However, it may also have the advantage that cache areas in main memory may be shared for caches with different users, allowing a more adequate usage of main memory resources.

According to embodiments, the swapping may be based on an evaluation of a first service level agreement of the first user and a second service level agreement of the second user. In particular, also other parameters may be taken into account like main memory utilization of the user, a user's schedule, and a user-defined performance metric. Using this approach, a much more fine granular automatic tuning of database operations may be performed coming closer to an ideal of a totally self-optimizing and "knob-less" database.

According to further embodiments, the restoration of the first cache may be performed on a standby secondary database system. Such a technique may be very useful in high availability installations of a hot standby of a second computer system, which may take over and continue operations if a first system may fail. In this case, a cache may not be slowly filled again with "useful" cache entries but may, right from the beginning, operate with the right cache entries according to a workload.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electro-magnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments have been described with reference to different subject-matters. In particular, some embodiments have been described with reference to method claims, whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method claims, and features of the apparatus claims, is considered as to be disclosed within this document.

The aspects defined above and further aspects of embodiments are apparent from the examples of embodiments to be described hereinafter and are explained with reference to the examples of embodiments, but to which the embodiments are not limited.

FIG. 1 shows a block diagram of a process 100 for cache handling in a database system according to an embodiment. The process 100 may include controlling operations of a set of caches in the database system, as shown in block 102, and determining whether a value of a cache quality parameter of a first cache out of the set of caches meets a cache image creation criterion relating to the first cache, as shown in block 104. Furthermore, the process 100 may include selecting at least one cache entry from the first cache, if a value of a related cache entry parameter meets a cache entry criterion, and if the value of the cache quality parameter of the first cache meets the cache image creation criterion, as shown in block 106, and creating a cache image based on the selected at least one cache entry and storing the cache image for further use, as shown in block 108.

Figure 2:
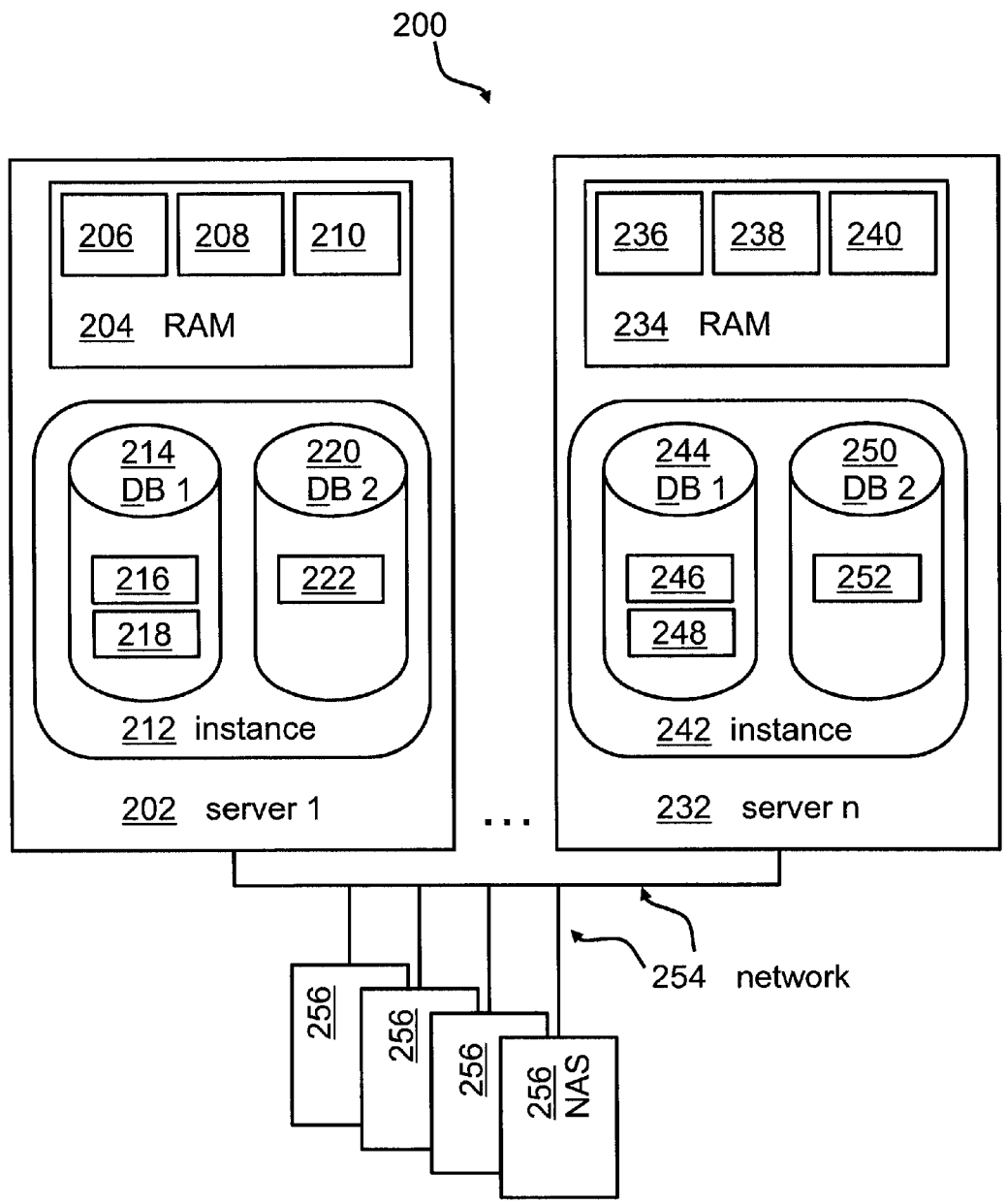
FIG. 2 shows a block diagram of servers with databases and caches according to an embodiment.

FIG. 2 shows a block diagram 200 of servers with databases and caches according to an embodiment. A first server 202 may include a main memory or random access memory (RAM) 204, of which parts may be caches 206, 208, 210. A database instance 212 or, in other words, a database system manager may control several logical databases 214 and 220. Each of the logical databases 214, 220 may have dedicated table spaces 216, 218, 222 that may individually be mapped to the caches 206, 208, 210.

Physically, the data of the logical databases may be stored in a backend storage system, for example, a network attached storage (NAS) 256 over a network 254. However, any other type of physical storage of the data may be used according to an embodiment. Also, direct attached disk drives to the servers 202, 232 may be used.

A second server 232 and even more may be configured comparable to the first server 202 with RAM 234, caches 236, 238, 240, a database instance 242, logical databases 244, 250 and table spaces 246, 248, 252.

Figure 3:
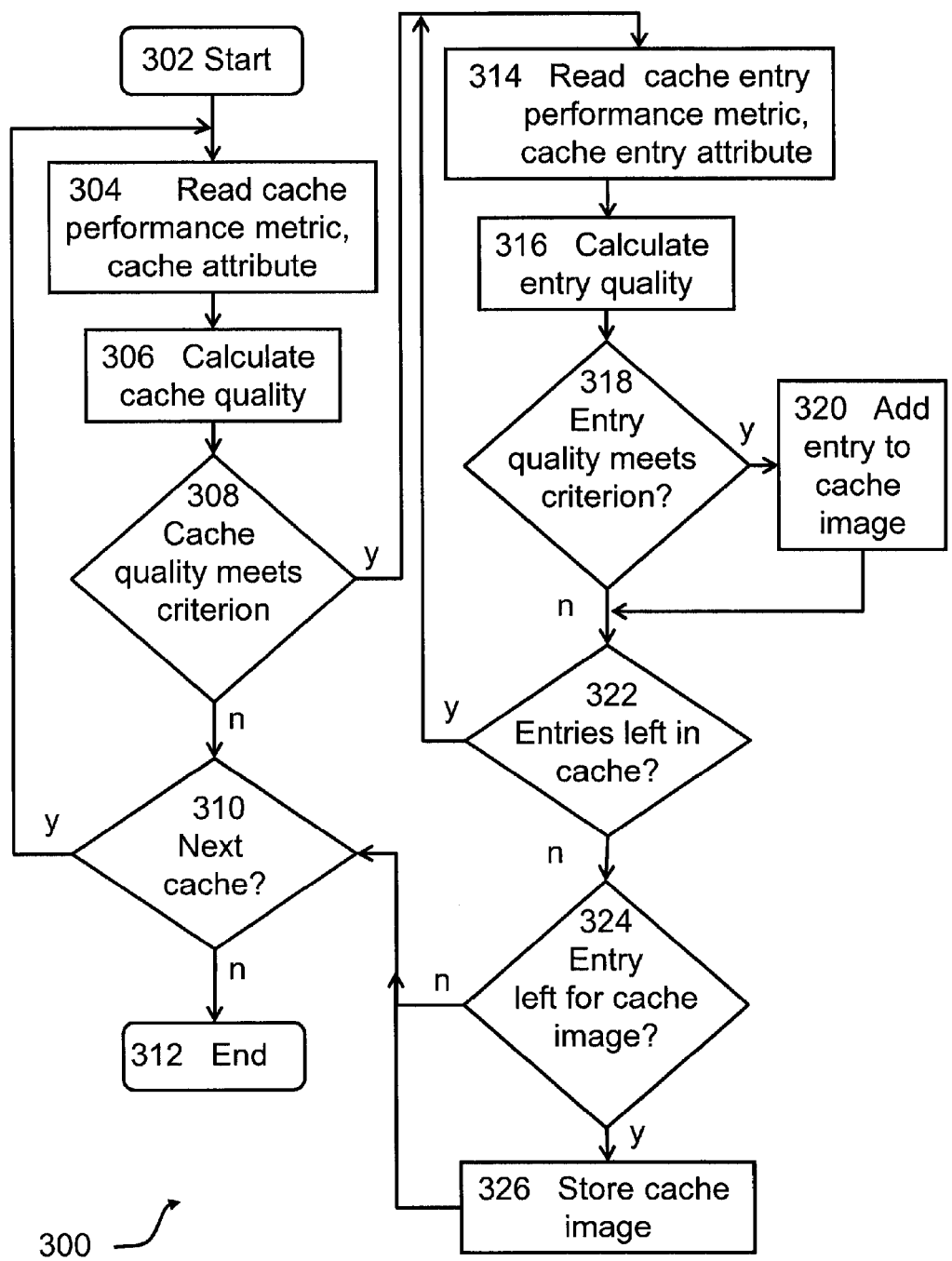
FIG. 3 shows an exemplary flow chart of a process for cache handling in a database according to an embodiment.

FIG. 3 shows an exemplary flow chart for a process 300 for cache handling in a database according to an embodiment. The process 300 may start at block 302. Next, cache performance metric values, as well as cache attributes, may be read from and by the database system, as shown in block 304. At block 306, the value is on a cache quality parameter, in particular, a plurality of values of current value parameters may be calculated. At block 308, it may be decided whether a cache quality parameter value may meet a cache image creation criterion. If that is not the case at block 310, operation of the algorithm may restart reading cache performance metric values again. In case there is no more cache in the system the algorithm may stop, as shown at block 312.

In case the cache image creation criterion may be met, entry performance metric values and entry attributes may be read from the database system, as shown at block 314. Next, a cache entry parameter value of an entry in the cache is calculated, as shown in block 316. Then, it is determined whether the cache entry parameter value exceeds a cache entry creation, as shown in block 318. If that is the case, the entry of the cache is added to a cache image, as shown in block 320. Otherwise, it is checked if there may be more entries in the cache left, as shown in block 322. If that is the case, operations will be continued at block 314, by reading entry performance metric values and entry attributes.

In case a cache image may not be filled up with entries of one cache at block 324, the system will check in other caches for entries to be replicated in the cache image for storage. Otherwise, the cache image is stored, as shown in block 326.

Figure 4:
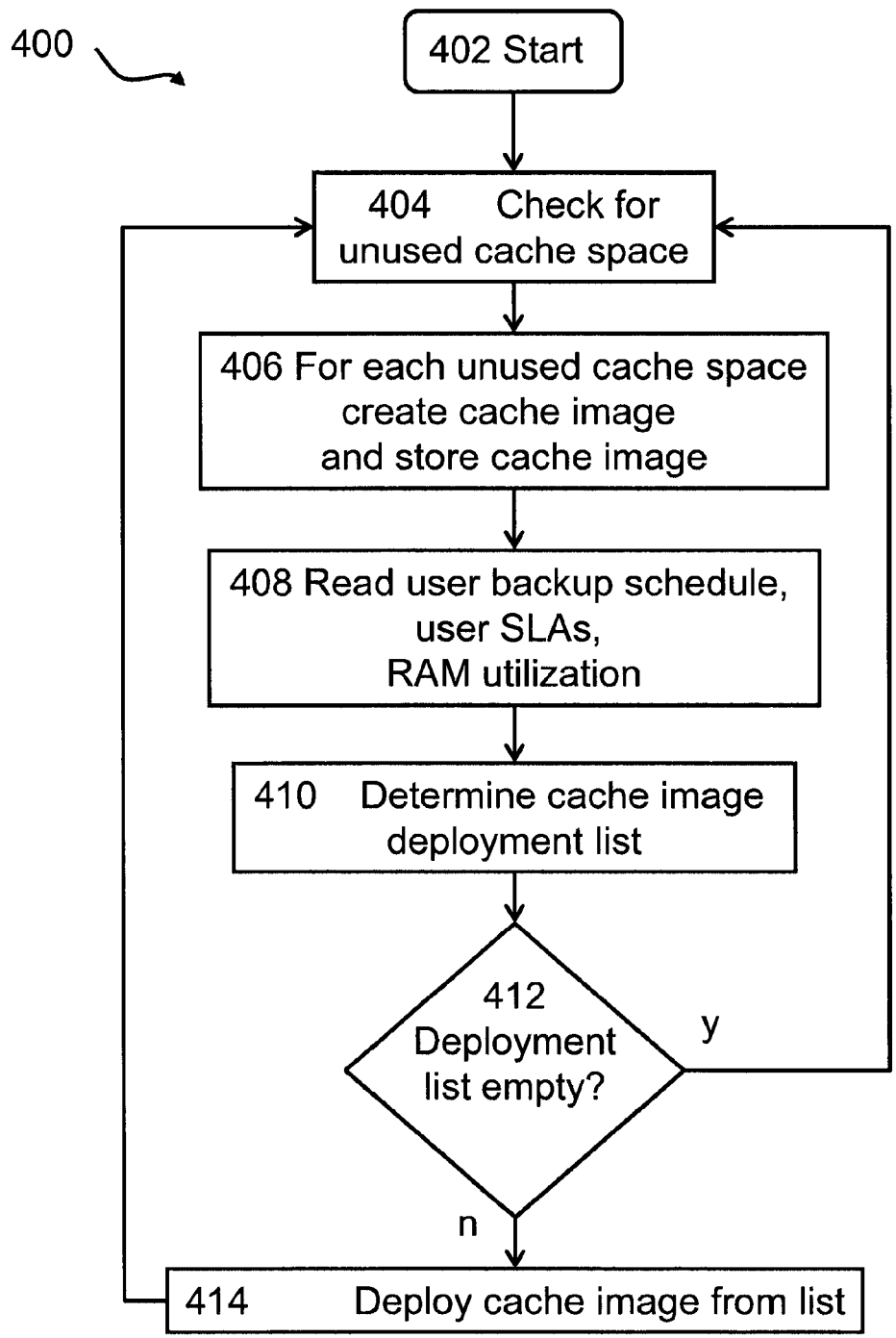
FIG. 4 shows an exemplary flow chart of a process for restoring of cache content according to an embodiment.

FIG. 4 shows an exemplary flow chart of a process 400 for restoring of cache content according to an embodiment. After a start of the process at block 402, the system may check for unused cache space in main memory, as shown in block 404. In this context, unused cache space means that entries are in the cache but they may not be used by any application. Thus, such a cache space may be used for other applications or purposes. Then, a cache image may be created and stored, for example, on a hard disk, as shown in block 406.

At block 408, a user schedule may be read using service level agreements, RAM utilization and other parameters. From this, a cache image deployment list may be determined, as shown in block 410. If the deployment list is not empty, a cache image may be retrieved from long-term storage or restored, or deployed from the deployment list, as shown in block 414. Otherwise, the process may restart at block 404, checking for unused cache space. This algorithm or process is, in particular, is useful for optimizing utilization of available cache space.

Figure 5:
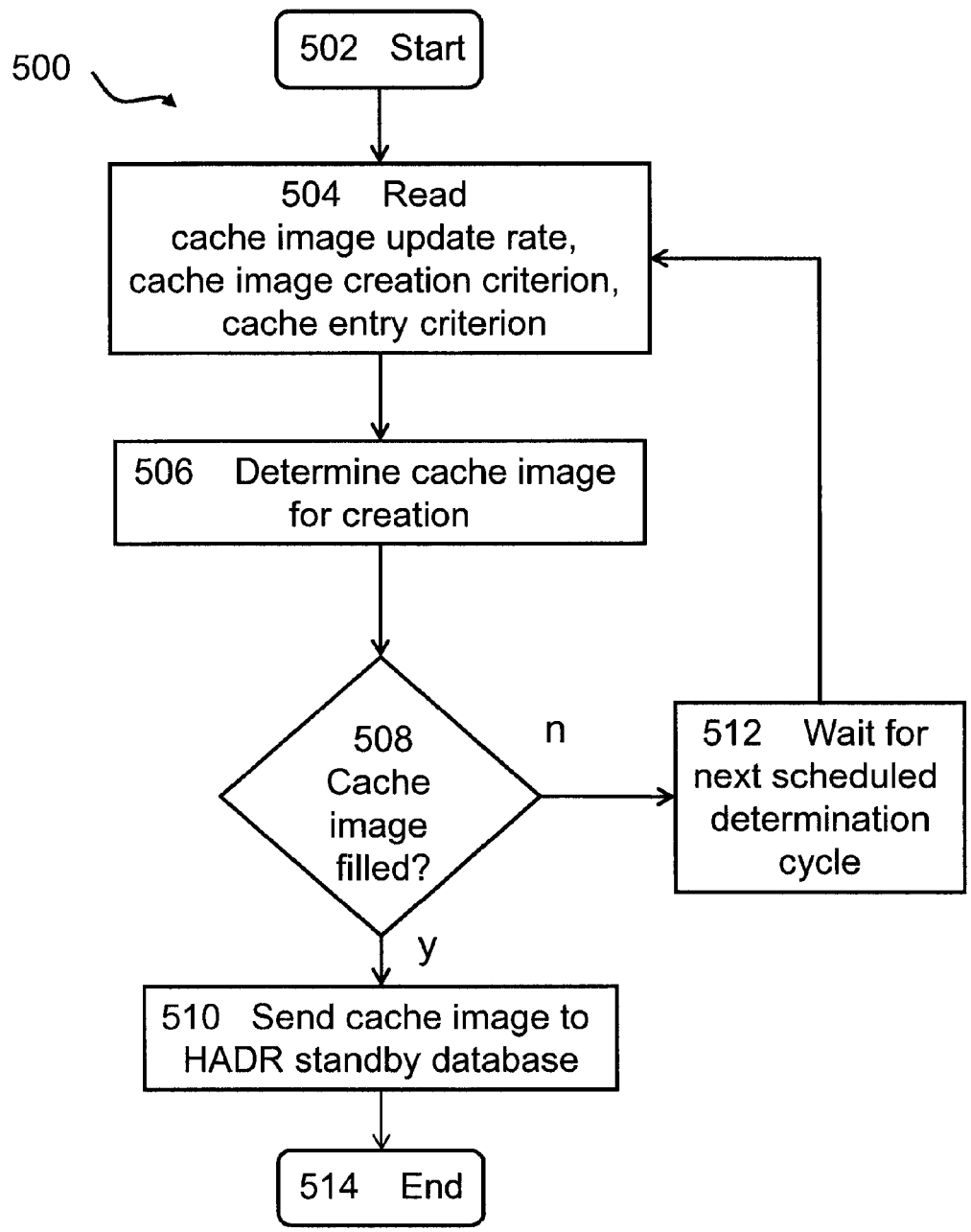
FIG. 5 shows a flowchart of a process for cache handling in a high availability environment according to an embodiment.

FIG. 5 shows a flowchart of a process 500 for cache handling in a high availability environment (HADR=high availability and disaster recovery) according to an embodiment. This process 500 may start at block 502. At block 504, the system may read a cache image update rate, a cache image creation criterion and a cache entry criterion. Next, it may be determined whether to create a cache image, as shown in block 506. For this purpose, the cache image update rate, the cache image creation criterion, and the cache entry criterion may be considered. Then, it may be determined whether the cache image is filled with entries, as shown in block 508. At block 512, if that is not the case, the system will wait for a next scheduled determination cycle and return to execution to block 504. In case the cache image is filled with entries, the complete cache image will be sent to a HADR standby database on another standby computing system, which may be a standby computer system, as shown in block 510. The process 500 may end at block 514. This process 500 may be regularly executed after a predetermined amount of time.

Such a system of regular database cache migrations in a HADR environment, combined with the method for cache handling as described above, may equip the standby database on a regular basis with the latest update of a stored cache image, such that the standby database may resume operations with a comparable cache content as in the original database in case of a system failure of the primary database or computer system. The cache content (i.e., database pages and/or database entries that are regularly accessed) will have the same characteristics for a given workload as the cache of the primary database on a primary system. This will have measurable performance advantages compared to a standby database that would not use the above described method.

Figure 6:
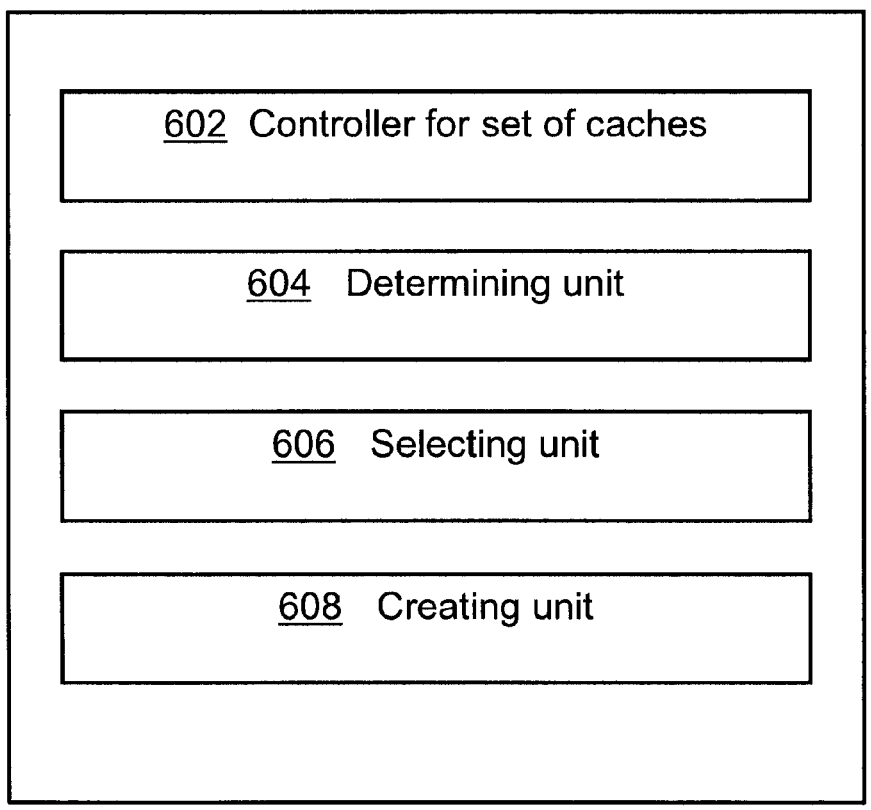
FIG. 6 shows a cache manager for cache handling in a database system according to an embodiment.

FIG. 6 shows an embodiment of a cache manager 600 for cache handling in a database system according to an embodiment. The cache manager includes a controller 602 adapted for managing a set of caches in the database system, and a determination unit 604 adapted for determining whether a value of a cache quality parameter of a first cache out of the set of caches meets a cache image creation criterion relating to the first cache. Furthermore, an embodiment of the cache manager 600 includes a selection unit 606 adapted for selecting at least one cache entry from the first cache, if a value of a related cache entry parameter meets a cache entry criterion, and if the value of the cache quality parameter of the first cache meets the cache image creation criterion, and a creation unit 608 adapted for creating a cache image based on the selected at least one cache entry and storing the cache image for further use.

Figure 7:
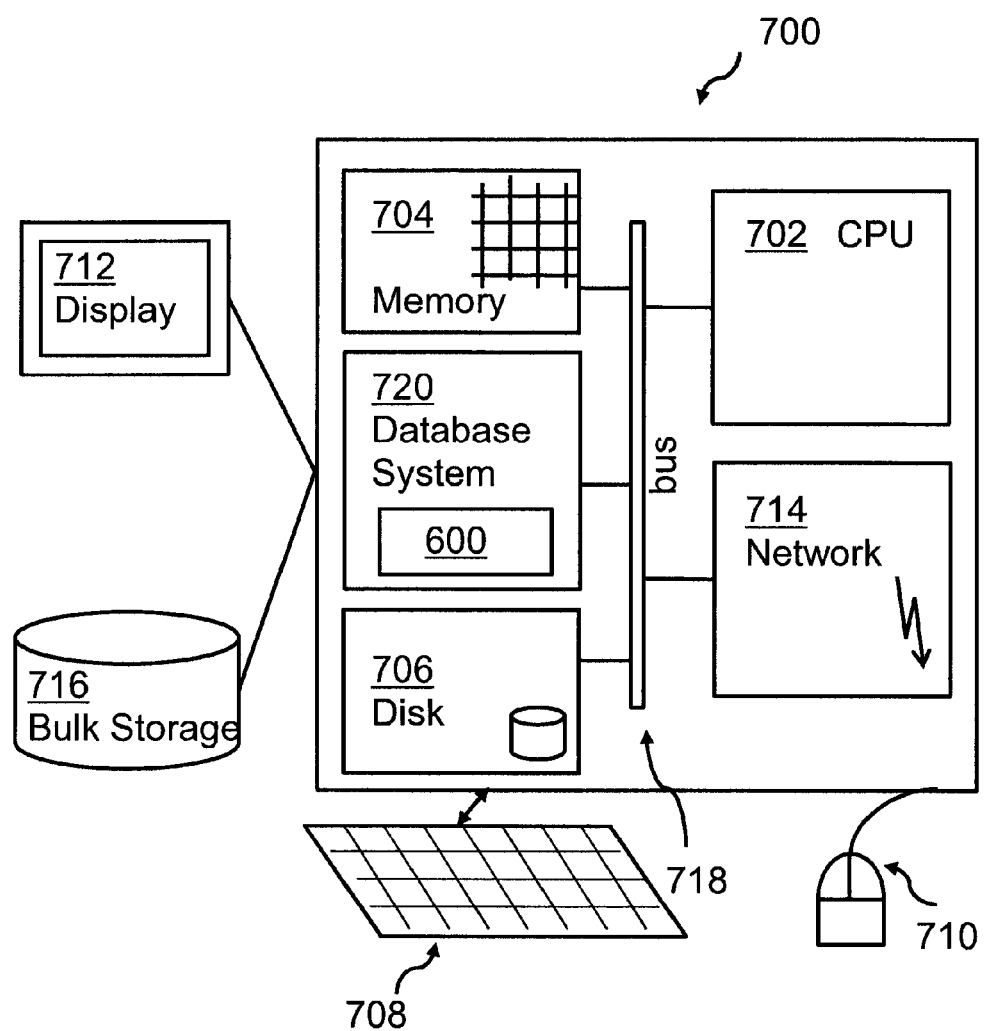
FIG. 7 shows an embodiment of a computing system comprising the cache manager according to an embodiment.

Embodiments may be implemented together with virtually any type of computer, regardless of the platform being suitable for storing and/or executing program code. For example, as shown in FIG. 7, a computing system 700 may include one or more processor(s) 702 with one or more cores per processor, associated memory elements 704, an internal storage device 706 (e.g., a hard disk, an optical drive such as a compact disk drive or digital video disk (DVD) drive, a flash memory stick, etc.), and numerous other elements and functionalities, typical of today's computers (not shown). The memory elements 704 may include a main memory, e.g., a random access memory (RAM), employed during actual execution of the program code, and a cache memory, which provides temporary storage of at least some program code and/or data in order to reduce the number of times, code and/or data must be retrieved from a long-term storage medium or external bulk storage 716 for an execution. Elements inside the computer 700 may be linked together by means of a bus system 718 with corresponding adapters. Additionally, a database system 720 comprising the cache manager 600 may be attached to the bus system 718.

The computing system 700 may also include an input device, such as a keyboard 708, a pointing device such as a mouse 710, or a microphone (not shown). Alternatively, the computing system may be equipped with a touch sensitive screen as main input device. Furthermore, the computer 700, may include an output device, such as a monitor or screen 712 (e.g., a liquid crystal display (LCD), a plasma display, a light emitting diode display (LED), or cathode ray tube (CRT) monitor). The computer system 700 may be connected to a network (e.g., a local area network (LAN), a wide area network (WAN), such as the Internet or any other similar type of network, including wireless networks via a network interface connection 714. This may allow a coupling to other computer systems, or a storage network, or a tape drive. Those, skilled in the art will appreciate that many different types of computer systems exist, and the aforementioned input and output devices may take other forms. Generally speaking, the computer system 700 may include at least the minimal processing, input and/or output devices, necessary to practice embodiments.

While the invention has been described with respect to a limited number of embodiments, those skilled in the art, having benefit of this disclosure, will appreciate that other embodiments can be devised, which do not depart from the scope of the invention as disclosed herein. Accordingly, the scope of the invention should be limited only by the attached claims. Also, elements described in association with different embodiments may be combined. It should also be noted that reference signs in the claims should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for cache handling in a database system, comprising:
   controlling operations of a set of caches in the database system;
   determining whether a value of a cache quality parameter of a first cache out of the set of caches meets a cache image creation criterion relating to the first cache;
   selecting at least one cache entry from the first cache, the selecting performed in response to a value of a related cache entry parameter meeting a cache entry criterion and the value of the cache quality parameter of the first cache meeting the cache image creation criterion; and
   creating a cache image based on the selected at least one cache entry and storing the cache image for further use.

2. The computer-implemented method of claim 1, wherein the value of the cache quality parameter is based on a combination of a performance metric and a cache attribute.

3. The computer-implemented method of claim 1, wherein the value of the related cache entry parameter is based on a combination of a cache entry performance metric and a cache entry attribute.

4. The computer-implemented method of claim 1, wherein a restoration of the first cache is performed during a start-up of the database system.

5. The computer-implemented method of claim 1, wherein the restoration of the first cache is performed during runtime of the database system.

6. The computer-implemented method of claim 1, wherein the first cache relates to a first user in a cloud computing environment.

7. The computer-implemented method of claim 6, wherein a content of the first cache, which relates to the first user, is stored on a long-term storage and a cache content of a second user is loaded from the long-term storage, such that the content of the first cache is swapped.

8. The computer-implemented method of claim 7, wherein the swapping is based on an evaluation of a first service level agreement of the first user and a second service level agreement of the second user.

9. The computer-implemented method of claim 1, wherein the restoration of the first cache is performed on a standby secondary database system.

10. A computer system for cache handling in a database system including a memory having computer readable computer instructions and a processor for executing the computer readable instructions, the computer system comprising:
    a controller adapted for managing a set of caches in the database system;
    a determination unit adapted for determining whether a value of a cache quality parameter of a first cache out of the set of caches meets a cache image creation criterion relating to the first cache;
    a selection unit adapted for selecting at least one cache entry from the first cache, the selecting performed in response to a value of a related cache entry parameter meeting a cache entry criterion and the value of the cache quality parameter of the first cache meeting the cache image creation criterion; and
    a creation unit adapted for creating a cache image based on the selected at least one cache entry and storing the cache image for further use.

11. A computer program product for cache handling in a database system, the computer program product comprising a non-transitory computer readable storage medium having computer readable program code embodied therewith, the computer readable program code comprising computer readable program code configured for:
    controlling operations of a set of caches in the database system;
    determining whether a value of a cache quality parameter of a first cache out of the set of caches meets a cache image creation criterion relating to the first cache;
    selecting at least one cache entry from the first cache, the selecting performed in response to a value of a related cache entry parameter meeting a cache entry criterion and the value of the cache quality parameter of the first cache meeting the cache image creation criterion; and
    creating a cache image based on the selected at least one cache entry and storing the cache image for further use.

12. The computer program product of claim 11, wherein the value of the cache quality parameter is based on a combination of a performance metric and a cache attribute.

13. The computer program product of claim 11, wherein the value of the related cache entry parameter is based on a combination of a cache entry performance metric and a cache entry attribute.

14. The computer program product of claim 11, wherein a restoration of the first cache is performed during a start-up of the database system.

15. The computer program product of claim 11, wherein the restoration of the first cache is performed during runtime of the database system.

16. The computer program product of claim 11, wherein the first cache relates to a first user in a cloud computing environment.

17. The computer program product of claim 16, wherein a content of the first cache, which relates to the first user, is stored on a long-term storage and a cache content of a second user is loaded from the long-term storage, such that the content of the first cache is swapped.

18. The computer program product of claim 17, wherein the swapping is based on an evaluation of a first service level agreement of the first user and a second service level agreement of the second user.

19. The computer program product of claim 11, wherein the restoration of the first cache is performed on a standby secondary database system.

* * * * *